US012351691B2

United States Patent
Jumeaux et al.

(10) Patent No.: US 12,351,691 B2
(45) Date of Patent: Jul. 8, 2025

(54) PROCESS FOR PREPARING A POWDER OF MATERIAL OF NATURAL ORIGIN (71) Applicants: AUTHENTIC MATERIAL, Toulouse (FR); INSTITUT NATIONAL POLYTECHNIQUE DE TOULOUSE, Toulouse (FR); INSTITUT NATIONAL DE RECHERCHE POUR L'AGRICULTURE, L'ALIMENTATION ET L'ENVIRONNEM, Paris (FR)

(72) Inventors: Margaux Jumeaux, Toulouse (FR); Paul Verniolle, Toulouse (FR); Antoine Rouilly, Toulouse (FR); Virginie Vandenbossche, Sainte-Foy-d'Aigrefeuille (FR)

(73) Assignees: AUTHENTIC MATERIAL, Toulouse (FR); INSTITUT NATIONAL POLYTECHNIQUE DE TOULOUSE, Toulouse (FR); INSTITUT NATIONAL DE RECHERCHE POUR L'AGRICULTURE, L'ALIMENTATION ET L'ENVIRONNMENT, Paris (FR)

( * ) Notice: Subject to any disclaimer, the term of this patent is extended or adjusted under 35 U.S.C. 154(b) by 289 days.

(21) Appl. No.: 17/759,892

(22) PCT Filed: Feb. 3, 2021

(86) PCT No.: PCT/EP2021/052472
§ 371 (c)(1),
(2) Date: Aug. 1, 2022

(87) PCT Pub. No.: WO2021/156273
PCT Pub. Date: Aug. 12, 2021

(65) Prior Publication Data
US 2023/0129744 A1 Apr. 27, 2023

(30) Foreign Application Priority Data

Feb. 3, 2020 (FR) .................................. 2001035

(51) Int. Cl.
*C08J 3/12* (2006.01)
*B29B 9/10* (2006.01)
(Continued)

(52) U.S. Cl.
CPC ....... *C08J 3/12* (2013.01); *B29B 9/10* (2013.01); *B29C 48/04* (2019.02); *B29C 48/14* (2019.02);
(Continued)

(58) Field of Classification Search
CPC ....... B29C 43/006; B29C 48/04; B29C 48/14; B29C 48/40; B29C 48/78; B29C 48/88;
(Continued)

(56) References Cited

U.S. PATENT DOCUMENTS

| 5,272,190 A * | 12/1993 | Kai ..................... C08L 21/00 8/94.18 |
| 2009/0226557 A1* | 9/2009 | Etayo Garralda ....... C08H 1/06 426/1 |
| 2018/0230644 A1* | 8/2018 | Purcell ..................... C14C 3/06 |

FOREIGN PATENT DOCUMENTS

| CN | 103224696 A * | 7/2013 | ............. B29C 48/04 |
| EP | 3536830 A1 * | 9/2019 | ............. C08L 67/04 |

(Continued)

OTHER PUBLICATIONS

Machine English translation of CN103224696A (Year: 2013).*
International Search Report; International Application No. PCT/EP2021/052472 dated May 11, 2021.

Primary Examiner — Xiao S Zhao
Assistant Examiner — Edgaredmanuel Troche
(74) Attorney, Agent, or Firm — Perman & Green, LLP (57) ABSTRACT

A process for preparing a powder of a material of natural origin, which includes a step of treating a substance con-
(Continued)

taining at least 70% by weight of one or more leather wastes in particle form in a twin-screw extruder, wherein a temperature profile is applied that increases from an initial temperature of between 10 and 40° C. up to a maximum temperature of between 60 and 120° C., in the presence of water in an amount such that the weight ratio of water to substance is between 0.20 and 6.

17 Claims, 1 Drawing Sheet (51) Int. Cl.
    *B29C 48/04*     (2019.01)
    *B29C 48/14*     (2019.01)
    *B29C 48/78*     (2019.01)
    *B29C 48/875*     (2019.01)
    *B29K 511/08*     (2006.01)
    *C08L 89/06*     (2006.01)

(52) U.S. Cl.
    CPC ............ *B29C 48/78* (2019.02); *B29C 48/875* (2019.02); *C08L 89/06* (2013.01); *B29K 2511/08* (2013.01); *B29K 2911/08* (2013.01); *C08J 2389/06* (2013.01); *C08J 2489/06* (2013.01)

(58) Field of Classification Search
    CPC ........ B29C 48/875; B29C 2948/92904; B29C 2948/92885; B29C 2948/92704; B29C 2948/9259; B29C 2948/92895; C14B 13/00; C08J 3/12; C08J 3/18; C08J 3/24; C08J 3/247; C08J 2389/06; C08J 2489/06; C08H 1/06; C08L 89/06; B29B 9/10; B29B 9/12; B29K 2511/08; B29K 2911/08
    USPC ...................................................... 264/202
    See application file for complete search history.

(56) References Cited

FOREIGN PATENT DOCUMENTS

| | | |
|---|---|---|
| FR | 3081468 | 5/2018 |
| JP | 0418500 | 1/1992 |
| WO | 2009135239 | 11/2009 |
| WO | 2019077112 | 4/2019 |

\* cited by examiner

PROCESS FOR PREPARING A POWDER OF MATERIAL OF NATURAL ORIGIN

CROSS REFERENCE TO RELATED APPLICATIONS

This application is a National Stage of International Application No. PCT/EP2021/052472, having an International Filing Date of 3 Feb. 2021, which designated the United States of America, and which International Application was published under PCT Article 21(2) as WO Publication No. 2021/156273 A1, which claims priority from and the benefit of French Patent Application No. 2001035, filed on 3 Feb. 2020, the disclosures of which are incorporated herein by reference in their entireties.

BACKGROUND

1. Field

The present disclosure relates to the field of valorizing substances of natural origin, more specifically of animal origin.

2. Description of Related Developments

More specifically, the present disclosure relates to a method for preparing a powder of a material of natural origin, from leather waste, as well as a powder of material of natural origin obtained with such a method.

BRIEF DESCRIPTION OF RELATED DEVELOPMENTS

The programmed depletion of fossil resources has for several years spurred industrialists to develop replacement solutions using renewable resources, in all industrial sectors. As such, recycling and valorizing waste of animal or plant origin are taking on a growing interest, both economically and environmentally.

It has thus been proposed in the prior art to manufacture items from solids formed from waste of animal or plant origin, for example from industrial waste obtained from livestock production or production waste such as cuttings generated when processing leather, with the aim of such items benefiting from both the aesthetic and mechanical properties of the natural material from which they are formed.

The patent document WO-A-2019/077112 describes for example a process for manufacturing an item in the form of a solid block, from a natural substance in particulate form containing scleroproteins, in particular leather. This process makes it possible to form solid parts in a material reproducing the properties of the initial natural substance, and even enhancing some of these properties.

The document FR-A-3081468 describes a process for manufacturing an item made of solid composite material from particles of a natural substance containing scleroproteins, these proteins being dispersed in a matrix of a thermoplastic polymer.

In both of these processes, the grain size of the particles of substance containing scleroproteins is a few hundred micrometers. Particles of such a size can be obtained with conventional grinding or shredding techniques, particularly by means of a knife or hammer mill.

Seeking to prepare such particles, and focusing more specifically on substances of natural origin of the type with a high collagen content, in particular leathers, the present inventors have developed a specific method which makes it possible to prepare a material in powder form the properties, in particular the mechanical properties, of which are substantially improved compared to the powders obtained with conventional grinding techniques. These properties render it very advantageous for use as a starting material in the processes for manufacturing items proposed by the prior art, in particular the processes mentioned above.

SUMMARY

The present disclosure therefore aims to provide a method making it possible to prepare a powder of a material based essentially on collagen, the properties of which are improved compared to the powders obtained with conventional grinding techniques.

An additional aim of the present disclosure is that this method is simple and inexpensive to implement, additionally by means of a routinely commercially available apparatus.

For this purpose, according to the present disclosure, a method is proposed for preparing a powder of a material of natural origin, from an initial substance containing at least 70% by weight of leather, particularly from leather waste, said leather being prepared from skin from a non-human animal; this initial substance being in particulate form.

In the present description, the term "leather" denotes, conventionally per se, an animal skin having undergone tanning and currying operations, so as to render it rot-proof. Leather contains a high collagen content.

The leather waste can be of any type, particularly leather industry production waste, used leather items or parts of items, etc.

The term "initial substance" denotes a single substance or a blend of a plurality of substances, which can optionally be leather, for example a blend of several types of different leather waste.

Particulate form denotes that the initial substance is in the form of particles of varying coarseness, with a size of a few tens or hundreds of micrometers or more, up to a few centimeters.

The term powder denotes a set of grains or granules of varying size, possibly up to a few millimeters, these grains or granules possibly being dry or wet, in particular having a high moisture content, up to 75 or 80%.

The method according to the present disclosure comprises a step of treating this initial substance, essentially of natural origin, and very predominantly based on collagen, in a twin-screw extruder wherein a temperature profile is applied that increases from an initial temperature of between 10° C. and 40° C., up to a maximum temperature of between 60 and 120° C., in the presence of water in an amount such that the weight ratio of water to said initial substance introduced into the extruder, in the dry state, is between 0.20 and 6.

The initial substance preferably comprises no polymer or polymer precursor substance. During the treatment step of the method according to the present disclosure, the initial substance is furthermore preferably not mixed with any polymer or polymer precursor substance. The treatment step of the method according to the present disclosure is thus in no way a compounding step, using a polymer binder, but a step of fragmenting the substance under the effect of the shearing forces exerted on it in the twin-screw extruder. This fragmentation is accompanied by a phenomenon of plasticization of the substance induced by the heating thereof, in the presence of a specific amount of water mixed with the initial substance.

It was discovered by the present inventors that, very surprisingly, the combination of these phenomena makes it possible to obtain a powder of material which has, with respect to the starting substance, not only a substantially reduced grain size, but also an increased bulk density, which can be up to two or three times greater, which, in particular, facilitates the storage, handling and working thereof.

The bulk density of the powder of material can be determined with the so-called tapped density measurement test, well-known to a person skilled in the art, according to the protocol described in the ASTM B527 standard, by measuring the height of the powder in a test tube after a series of vertical taps, for example 2500 taps at a rate of 249 taps per minute. An example of a suitable instrument for implementing this test is Densi-tap marketed by the company Ma.Tec.

Furthermore, this powder obtained according to the present disclosure has mechanical properties such that, when used as a starting material in a process for manufacturing items in material of natural origin, particularly one of the processes mentioned above, for example by thermopressing, it gives this item a superior mechanical strength to that of the parts obtained from the powdery substances of the prior art, obtained with conventional grinding techniques. Such an advantageous result could in part be explained by the fact that the powder of material obtained according to the present disclosure would have a superior sintering capability when it is subjected to a temperature rise. This item furthermore has a superior moisture resistance, in particular due to the fact that the powder of material obtained by the method of the present disclosure is advantageously less hygroscopic than the initial substance whereon the method of the present disclosure has been applied.

Collagen is a fibrous structural protein, forming a triple helix, present in the connective tissue of animals and having the function of giving these tissues mechanical resistance under stretching. Collagen, more specifically type I collagen, is in particular the predominant protein in the dermis of animals.

The phenomena underpinning the obtaining of the very advantageous properties of the material in powder form obtained with the method according to the present disclosure will not be prejudged here. It can however be assumed that during the step of treating the initial substance in the extruder, the combination of the shearing forces which are exerted on the substance therein, and of the temperature rise, has the effect of modifying the three-dimensional structure of the protein collagen, thus facilitating the penetration of water between the protein chains, the whole inducing a change of protein conformation, with transition from an α helix structure to a β sheet structure, enabling the protein chains to better interact with one another. This change of conformation would help give the material obtained the advantageous properties thereof.

The initial substance from which the method of the present disclosure is applied contains leather from the dermis of a non-human animal, particularly of a reptile or a mammal, for example of a bovine or an ovine.

This leather can be of any type, and particularly just as well be obtained by treating the dermis of the animals with plant-based tanning agents, as by tanning with chromium or with synthetic tannins.

According to the present disclosure, the initial substance can contain at least 80% by weight, or at least 90% by weight or even at least 95% by weight, of leather, in particular of leather waste.

The initial substance, based on collagen, from which the method according to the present disclosure is applied can be in the form of particles of any size, any shape and any moisture content. Preferably, it is in the form of particles of between 5 mm and 10 cm in size. When the initial substance is in the form of larger-sized pieces, the method of the present disclosure preferably comprises a prior step of cutting and/or grinding this substance into smaller-sized particles, for example by means of a knife mill.

The method of the present disclosure may furthermore fulfil one or more of the features described hereinafter, used on their own or in each of the technically effective combinations thereof.

The initial temperature of the temperature profile applied in the extruder is preferably between 15 and 30° C.

The maximum temperature of the temperature profile applied in the extruder is preferably less than or equal to 100° C., preferably between 60 and 100° C., preferably between 60 and 95° C. and more preferably between 60 and 90° C. A temperature within these latter value ranges makes it in particular advantageously possible to obtain the final properties sought for the powder obtained, while requiring a reduced energy input. Below 60° C., the powder obtained at the extruder outlet does not have the desired properties. In particular, it has neither a high bulk density, nor good mechanical properties. It furthermore has a small proportion of grains of reduced size, in particular of less than 0.8 mm in size.

The residence time of the substance in the twin-screw extruder is dependent on the rotational speed of the screws, and on the number and length of the kneading zones. It is for example between 20 seconds and 1 minute.

In specific embodiments of the present disclosure, the weight ratio of water relative to the initial substance is between 0.2 and 2.

In alternative embodiments of the present disclosure, the step of treating the initial substance is carried out in the presence of water in an amount such that the weight ratio of water relative to the initial substance is greater than or equal to 0.2 and less than 1.6 preferably between 0.25 and 1, particularly between 0.3 and 1, for example between 0.4 and 0.8, particularly between 0.5 and 0.7. It is for example equal to 0.6.

In this weight ratio range between 0.2 and 1.6, a powder is obtained of grains in dry form, or at least with a very low moisture content, less than 15%, and wherein a large majority of the grains are less than or equal to 0.8 mm in size. These grains furthermore have a homogeneous, ovoid to spherical shape, with a clearly determined shape factor, this shape factor being advantageously constant over the entire range from 0.2 to 1.6 (excluding this bound), regardless of the characteristics of the initial substance and regardless of the operating conditions, particularly the temperature conditions, applied in the extruder, these temperature conditions obviously being within the ranges recommended by the present disclosure.

More specifically, within the entire weight ratio range between 0.2 and 1.6 (excluding this bound), 60 to 90% of the powder grains obtained at the end of the method according to the present disclosure have a shape factor of between 0.7 and 1. The shape factor considered here is the roundness c of the grain, determined according to the equation:

$$c = 4 \times \pi \times (\text{Area}/\text{Perimeter}^2)$$

wherein Area and Perimeter respectively represent the area and perimeter of the grain, calculated on the basis of the maximum Feret diameter of the grain, i.e., the distance between two parallel lines passing through the furthermost ends of the grain (here, longest dimension of the grains).

In other alternative embodiments of the present disclosure, the step of treating the initial substance is carried out in the presence of water in an amount such that the weight ratio of water relative to the initial substance is between 1.6 and 6, for example between 2 and 6. In such embodiments, the powder obtained at the extruder outlet is in the form of a set of granules, approximately 1 or 2 mm in size, with a high moisture content, between 40 and 75%, not having clearly defined shape characteristics, but advantageously having a substantially greater bulk density relative to granules that would have been obtained by merely grinding the initial substance. These granules can be for example advantageously applied for manufacturing composite materials.

The amount of water to be added to the initial substance is dependent on the initial moisture content of the latter. Thus, the method according to the present disclosure can comprise a step of determining the moisture content of the initial substance, then determining the amount of water to be added thereto to obtain the sought weight ratio of water to the initial substance, this ratio being between 0.2 and 6, more specifically between 0.2 and 1.6, or between 1.6 and 6.

Herein, the term moisture content denotes, conventionally per se, the mass percentage of water contained in the substance, relative to the total substance mass, under conditions of 60% relative air humidity and at approximately 20° C. This moisture content can in particular be determined by comparing the weight of a sample of substance with the weight of the same sample after it has undergone a drying step at more than 100° C. until a substantially constant sample weight is obtained.

The initial substance can be placed in the presence of water in different ways.

In preferred embodiments of the present disclosure, the initial substance is introduced into the extruder as is, and an aqueous solution is also introduced into the twin-screw extruder, independently from the initial substance. Thus, the initial substance is placed in the presence of water by introducing an aqueous solution into the twin-screw extruder.

The feed rate of aqueous solution in the extruder is preferably constant, and calculated to obtain the sought weight ratio of water to substance, this ratio being between 0.2 and 6, in particular greater than or equal to 0.2 and less than 1.6. Such a calculation falls within the expertise of a person skilled in the art, who will particularly take into account the feed rate of the initial substance into the extruder and the initial moisture content of this substance to carry it out.

The aqueous solution is preferably introduced into the twin-screw extruder upstream from a first kneading zone of the twin-screw extruder, at the end of the conveying zone immediately preceding the first kneading zone, in the flow direction of the substance in the extruder. The initial substance is then intimately mixed with the aqueous solution in the kneading zone.

In alternative embodiments of the present disclosure, the initial substance is impregnated with an aqueous solution prior to the introduction thereof into the extruder. This impregnation is preferably carried out for 12 to 30 hours, preferably at a temperature of between 1 and 10° C. The impregnation step preferably comprises at least one initial stirring phase, so as to ensure a homogeneous mixture of the water with the initial substance. The stirring can be continued for all or part of the impregnation step. The mixed amounts of respectively aqueous solution and initial substance are determined so as to obtain the sought weight ratio of water to initial substance.

For any one of the embodiments above, the aqueous solution can consist solely of water. It can alternatively contain at least one additional substance.

The aqueous solution can in particular contain an agent for decomplexing chromium-collagen complexes, which may have been formed in the leather during chromium tanning processes. The use of such a decomplexing agent in the aqueous solution advantageously facilitates water penetration in the initial substance during the extrusion treatment step, and increase the bulk density of the material obtained.

This decomplexing agent can in particular consist of sodium hydroxide and/or magnesium hydroxide, for example at a concentration in water of between 10 and 40 g/l.

It can alternatively for example consist of oxalate, and in particular ammonium oxalate and/or sodium oxalate, for example at a concentration in water of between 25 and 40 g/l.

Both sodium hydroxide and sodium oxalate have the advantage of being readily available and of having a good dissolvability in water.

The aqueous solution can also or alternatively contain one or more surfactants.

Preferably, the method according to the present disclosure uses no organic solvent.

The twin-screw extruder used according to the present disclosure can be of any conventional type per se. It is preferably of the co-rotating screw type, preferably of the interpenetrating screw type. The screws used can have any profile and any screw pitch.

The rotational speed of the screws of the twin-screw extruder is preferably between 100 and 400 rpm, and preferably between 200 and 300 rpm. A speed within this range of values is advantageously, on one hand, high enough to ensure good plasticizing of the substance treated in the extruder, and, on the other hand, low enough not to risk this substance disintegrating in the extruder.

The specific mechanical energy (SME), expressing the work supplied by the screws of the twin-screw extruder to shear the initial substance, is preferably between 400 and 1800 Wh/kg.

The specific mechanical energy is defined by the following equation:

$$SME = \frac{U \times I \times \cos\varphi \times N}{N_{max} \times Q}$$

wherein U represents the voltage of the twin-screw extruder motor, expressed in volts; I represents the current intensity of this motor (read value), expressed in amperes; cos φ represents the motor correction coefficient (supplied by the manufacturer); N represents the rotational speed of the extruder screws, expressed in rpm; $N_{max}$ represents the maximum rotational speed of the extruder screws, expressed in rpm; and Q represents the input flow rate of the solid initial substance into the extruder, expressed in kg/h.

The twin-screw extruder used according to the present disclosure can include one or more zones. The substance of natural origin passes successively through these zones, from a first end, wherein the substance to be treated enters the extruder, to a second end, from which the treated substance comes out of the extruder.

The twin-screw extruder used according to the present disclosure preferably includes one or more conveying zones, with and/or without compression of the substance, and one or more kneading zones, as well as optionally one or more reverse-flighted screw zones. Any combination of such zones in the extruder falls within the scope of the present disclosure.

Preferably, the twin-screw extruder includes at least two kneading zones, and even three or more kneading zones.

In preferred embodiments of the present disclosure, the twin-screw extruder includes a conveying zone before and after each kneading zone.

Preferably, the twin-screw extruder used according to the present disclosure includes the series of the following zones: conveying-kneading-conveying-kneading-conveying.

The twin-screw extruder used according to the present disclosure does preferably not include any die at the exit.

The twin-screw extruder used according to the present disclosure can include any means enabling the application of the sought temperature profile in each of the zones included therein.

The term "increasing temperature profile" denotes in the present description that the temperature increases between the initial temperature, which is typically applied in the entry zone of the twin-screw extruder, and the final temperature, which is typically the temperature applied in the last kneading zone of the twin-screw extruder, in the direction of circulation of the substance in the twin-screw extruder. The temperature increase profile is not necessarily linear, and it can include several stages. As a general rule, the temperature is preferably substantially uniform within each of the zones of the twin-screw extruder, and, for each zone, it is greater than or equal to the temperature of the zone located upstream, in the direction of circulation of the substance in the twin-screw extruder. The temperature within the end conveying zone of the twin-screw extruder can be less than that of the kneading zone preceding it.

In specific embodiments of the present disclosure, the twin-screw extruder comprises one or more induction coils making it possible to supply, in each zone which the substance passes through, the sought thermal energy.

The temperature profile applied in the twin-screw extruder is preferably such that the temperature increases along the latter, between the substance input end thereof and the exit end thereof.

Preferably, the temperature in the first zone which the substance passes through, called first temperature, is approximately 20° C. This first zone is preferably a conveying zone.

In preferred embodiments of the present disclosure, the maximum temperature in the twin-screw extruder is less than or equal to 100° C., in particular between 60 and 100° C., preferably between 60 and 95° C., for example between 60 and 90° C. or between 60 and 80° C. This maximum temperature is preferably the temperature of at least the last kneading zone which the substance passes through in the extruder.

Throughout the present document, the values indicated relating to the temperatures applied in the extruder are the set-point values, it being understood that the actual temperature values in the treated substance circulating in the extruder can be slightly different, particularly depending on the composition of this substance and the water content thereof, as well as the exact temperature profile which is applied.

The input flow rate of the substance of natural origin into the twin-screw extruder is preferably constant. In particular embodiments of the present disclosure, it is between 1 and 15 kg/h, expressed in dry substance weight. The initial substance introduced into the extruder can have any initial moisture content.

The method according to the present disclosure can further comprise, after the step of treating the substance in the twin-screw extruder, a step of drying the extrudate obtained at the extruder outlet, at the end the treatment step of the method of the present disclosure.

This drying step can be carried out in any conventional manner per se for a person skilled in the art, in particular in an oven, preferably under an air flow.

The drying can for example be carried out at a temperature between 40° C. and 60° C., for some hours, particularly for 10 to 30 hours.

The method according to the present disclosure can finally comprise a final step of grinding the extrudate, by means of any mill conventional per se, where applicable after the extrudate has undergone the drying step, so as to reduce the grain size further.

In particular, when the initial substance contains a large amount of leather cuttings, the extrudate obtained at the exit of the twin-screw extruder may not be directly in powder form, but in the form of a paste. This paste can, however, advantageously be very easily ground, to form a powder with a particle size much smaller than that which the powder obtained by direct grinding, under the same conditions, of the initial substance would have had.

The process according to the present disclosure can also comprise a step of recovering, in the powder obtained at the extruder exit, where applicable after the drying thereof, the population of powder grains having a grain size within a sought range, in particular a grain size less than or equal to 800 µm. This recovery step can be carried out according to any conventional method per se, particularly by screening the powder, by means of a screen of suitable mesh size, in particular 800 µm.

Another aspect of the present disclosure relates to a powder of material of natural origin containing at least 70% by weight of leather, this powder being obtainable by a method according to the present disclosure, optionally comprising one or more final steps such as those described above, particularly of grinding, drying and/or screening aiming at recovering only the grains of powder of the sought size, i.e., less than 800 µm.

The powder according to the present disclosure can in particular contain at least 80% by weight, and even at least 90% by weight or at least 95% by weight, of leather.

It preferably comprises at least 50% by weight, preferably at least 70% by weight, more preferably at least 80% by weight, and preferably at least 90% by weight, of collagen.

The powder according to the present disclosure has a bulk density of between 0.25 and 0.9 and a grain size less than 800 µm.

In the present description, "grain size less than 800 µm" is intended to mean that the greatest dimension of each of the particles forming the powder is less than 800 µm. As a general rule, these particles have an elongated, ovoid to spherical-like shape. Their shape factor is between 0.7 and 1.

The greatest dimension of each of the particles of the powder of material according to the present disclosure can for example be verified by observing these particles with a binocular magnifier, or by means of a vibrating screen.

The powder of material of natural origin according to the present disclosure, formed very predominantly of leather, proves to be very advantageous as a starting material for manufacturing solid items by a thermoforming technique, or as a filler of a composite material, wherein it is dispersed in a polymer resin, in particular of thermoplastic type.

The items thus obtained have properties of mechanical strength, as well as resistance to wet environments, which are particularly good.

BRIEF DESCRIPTION OF THE DRAWINGS

The features and advantages of the present disclosure will emerge more clearly in the light of the examples of implementation hereinafter, provided merely by way of illustration and not restriction of the present disclosure, with reference to FIGS. 1 to 2, wherein.

DETAILED DESCRIPTION

Materials and Methods
Twin-Screw Extruder

For the experiments described hereinafter, Clextral BC-21 twin-screw extruders with a 70 cm sleeve or Clextral BC-45 twin-screw extruders, equipped with 7 Parmilleux R heating modules and a DKM pump with a power of 0.37 kW for the water supply in the extruder, are used.

In each of the extruders, a series of modules are assembled according to an arrangement ensuring an alternation of conveying zones and kneading zones.

The conveying modules used are, according to the experiments, of the following type: forward-flighted screw with double-threaded trapezoidal groove (at least one of these modules is placed in first position in the extruder, at the starting substance feed input); forward-flighted screw with double-threaded U-shaped groove which achieve both conveying the substance but also compressing it by reducing the thread pitch; and/or reverse-flighted screw with perforated double-threaded U-shaped groove which push the substance through channels, which supplies very substantial shear stress.

The kneading modules are of the bilobe mixer type.

The substance to be treated is introduced into the extruder via a hopper associated with a calibrated scale.

In each of these modules, the screw pitches are between 20 and 70 mm.

Differential Scanning Calorimetry (DSC) Analysis

The thermal DSC studies were carried out on a Mettler Toledo Star DSC apparatus in a medium-pressure capsule, with temperature scanning from 20° C. to 220° C. with a gradient of 20° C./min in a nitrogen stream.

Moisture Content Measurement

The moisture content of the initial substances and the materials obtained is measured on samples of between 2 and 4 g in mass, in an aluminum cup, by means of a Mettler infrared moisture analyzer.

Infrared-Attenuated Total Reflectance (IR-ATR) Spectrometry Analysis

This analysis, making it possible to identify the amount of each protein conformation, to determine whether the transition of the α helixes into random coils and β sheets is effective, is carried out with a Thermo Fischer Nicolet® 5700 infrared spectrometer, with ATR System, equipped with a diamond tip. The study interval is from 600 to 4000 $cm^{-1}$ and the resolution 4 $cm^{-1}$. A blank is carried out before each measurement, and at least 30 analyses are carried out for one spectrum, by observing the decomposition at amide peak 1 between 1570 and 1777 $cm^{-1}$, using data processing and analysis software.

Bulk Density Measurement

The bulk density of the powders is measured with the tapped density test, whereby a known mass of powder, between 20 and 100 g, is introduced into a graduated test tube mounted on a Densi-tap, and 2500 taps are applied in 10 min on the test tube. The final volume of the powder is read, as well as the weight thereof, and the bulk density thereof is inferred therefrom.

Grain Size Measurement

The grain size is measured by means of a vibrating screen. More specifically, a series of screens marketed by Retsch of the following respective sizes is used: 0 mm; 0.032 mm; 0.063 mm; 0.125 mm; 0.250 mm; 0.500 mm; 0.800 mm; 1.25 mm. Each screen is weighed empty and clean. Once the screens have been stacked in the order of increasing size, a sufficient amount of substance to cover the upper screen by approximately 1 cm is added. The vibration frequency is set to 70% of the maximum frequency and the vibration time is set to 10 min. Once the cycle has been completed, each screen is weighed with the retained powder grain size fraction, and the population mass distribution in each screen is determined.

Flexural Test

The flexural test is carried out on test specimens of the material to be tested, on a flexural test bench using the method described in the standard NF EN ISO 178-1:2011, with the following operating parameters:
 distance between the pressure points L=46 mm;
 force applied by the upper punch at a constant rate of 2.5 mm/min at 23° C.;
 5 kN force sensor to record the force.

Hydric Characterization Test

The hydric characterization test is carried out by submerging, in water at 25° C., square test specimens, having the dimensions 5×5 cm, of the material to be tested. The test specimens are weighed and measured before submerging, then every hour after initially submerging in water. After submerging for 24 hours, the test specimens are dried completely at 50° C., and the dry mass thereof is measured to define the potential substance loss by dissolving in water.

Example 1—Leather Tanned with Plant-Based Tanning Agents

The initial substance is leather of bovine origin, in the form of pieces of approximately 1 cm, of bulk density 0.21 $g/cm^3$ and having a 13% moisture content.

The Clextral BC-21 extruder is used for this experiment, with a rotational speed of the screws of 300 rpm. The screw profile is as follows (for each zone, the temperature profile is indicated between brackets): conveying (20° C.)-kneading (40° C.)-conveying (60° C.)-kneading (90° C.)-conveying (80° C.). The initial substance is introduced at the start of the first conveying zone, with a flow rate of 4 kg of dry substance/h. Water is introduced into the extruder at the kneading zone, with a flow rate of 3 l/h.

At the extruder exit, a powder of material having a bulk density of 0.9 g/cm$^3$ and a 10% moisture content is obtained with a flow rate of 4 kg/h.

The IR-ATR analysis of the initial substance shows an α helix structure at 38%, β sheets at 20% and random coils at 42%. For the final material, the IR-ATR analysis shows an α helix structure at 24%, β sheets at 25% and random coils at 48%. This result confirms the change of protein structure in the substance during the implementation of the method according to the present disclosure.

The powder obtained is shaped by thermocompression, at 150° C. and 80 MPa, of 12 g of powder in a steel mold. A part in the form of a solid block is thus obtained.

The swelling rate in water of this part is determined according to the protocol described in the standard NF EN ISO 62.2, with the following few modifications: the test specimens used have dimensions of 5×5 cm and 3 mm of thickness; the water and the test specimens are kept at 25° C. and 60% humidity. Each test specimen is placed in a 1 l capacity container, in 300 ml of distilled water. 72 hours before submerging, the containers containing the distilled water are placed under atmospheric conditions 25° C. and 60% humidity and the test specimens are dried at 50° C. After submerging, the dimensions of the test specimens and the masses thereof are recorded every hour over a 24-hour period. After 24 hours, the test specimens are oven-dried at 50° C. for 24 hours to measure the total substance loss and the final thickness once dried.

A 16% swelling rate is thus determined. By way of comparison, the swelling rate obtained for a part formed by thermocompression of the initial substance, before implementing the extrusion method according to the present disclosure, according to the same protocol as that described above, is 42%.

Example 2—Leather Tanned with Plant-Based Tanning Agents

The initial substance is cow leather in the form of pieces of approximately 1 cm, of bulk density 0.2 g/cm$^3$, of moisture content 16%.

The Clextral BC-45 extruder is used for this experiment, with a rotational speed of the screws of 200 rpm. The screw profile is as follows: conveying at 20° C.-kneading (angular shift between the lobes 30°) at 40° C.-conveying at 40° C.-kneading (angular shift 90°) at 60° C.-conveying at 60° C.-kneading at 80° C.-conveying at 80° C. The initial substance is introduced at the start of the first conveying zone, with a flow rate of 6.5 kg of dry substance/h. Water is introduced into the extruder at the end of the first conveying zone, just before the first kneading zone, with a flow rate of 1 0/h.

The extrudate obtained at the extruder exit is dried in a ventilated oven at 40° C. for 24 hours.

A powder of material of bulk density 0.93 g/cm$^3$, moisture content 8%, and of the following grain size distribution is obtained: 2% greater than 1.25 mm in size, 70% between 0.5 and 0.2 mm in size; 8% between 0.2 and 0.125 mm in size; 20% between 0.125 and 0.063 mm in size.

The population of grains of powder having a grain size around 1 cm is shaped by uniaxial thermocompression at 150° C. and 80 MPa. The part obtained undergoes a flexural test. The following results are obtained: maximum stress 9.8+/−0.6 MPa, bending modulus 1560+/−150 MPa, deformation at rupture 1.35%+/−0.07%.

In comparison, for a part obtained by thermocompression, according to the same protocol, from the population of grains of less than 0.8 mm in size of the powder obtained at the end of the method of the present disclosure, the following mechanical characteristics are determined: maximum stress is 35+/−1 MPa; bending modulus 2478+/−370 MPa; maximum deformation 1.8%+/−0.1%. These properties are substantially superior, in particular approximately 3.5 times superior as regards the maximum stress, to those obtained from the initial substance, not treated according to the present disclosure.

As regards the water resistance, it is observed that the part formed by thermocompression from the material obtained at the end of the method according to the present disclosure has, compared to the part formed from the untreated initial substance, after submerging for 24 hours in water: a 22% mass gain instead of 44%; 10% swelling instead of 39%; a 6% irreversible mass loss instead of 10%; an irreversible swelling rate of 16% instead of 42%. The part formed by thermocompression from the material obtained by the method according to the present disclosure clearly has a substantially superior water resistance.

Example 3—Chromium-Tanned Leather

The initial substance is cow leather in the form of pieces of approximately 1 cm, of bulk density 0.20 g/cm$^3$, and having a moisture content of 18%.

The conditions used are identical to those of example 2, with the exception of the substance input flow rate into the extruder, which is 8 kg of dry substance/h.

A powder of material of bulk density 0.4 g/cm$^3$, moisture content 12%, and of the following grain size distribution is obtained: 16% of particles greater than 1.25 mm in size; 8.5% between 0.8 and 1.25 mm in size; 30.2% between 0.8 and 0.5 mm in size; 14.3% between 0.5 and 0.2 mm in size; 24% between 0.2 and 0.125 mm in size; 3% between 0.125 and 0.063 mm in size, 4% between 0.063 and 0.032 mm in size.

The population of grains of powder having a grain size around 1 cm is shaped by uniaxial thermocompression at 190° C. and 80 MPa. The part obtained undergoes a flexural test. The following results are obtained: maximum stress 8.8+/−3.1 MPa, bending modulus 1026+/−373 MPa, deformation at rupture 2.4%+/−0.6%.

In comparison, for a part obtained by thermocompression, according to the same protocol, from the population of grains of less than 0.8 mm in size of the powder obtained by the method according to the present disclosure, the following mechanical characteristics are determined: maximum stress is 38.2+/−0.4 MPa; bending modulus 2208+/−59 MPa; maximum deformation 2.0%+/−0.1%. These properties are much better, in particular approximately 4.7 times better as regards the maximum stress, than those obtained from the initial substance, not treated according to the present disclosure.

As regards the water resistance, it is observed that the part formed by thermocompression from the material obtained by the method according to the present disclosure has, compared to the part formed from the untreated initial substance, after submerging for 24 hours in water: a 57% mass gain instead of 73%; 39% swelling instead of 95%; a 22% irreversible mass loss instead of a total loss of cohesion; an irreversible swelling rate of 36% instead of a total loss of cohesion. The part formed by thermocompression from the material obtained by the method of the present disclosure clearly has a substantially superior water resistance.

Example 4—Pink-Colored Chromium-Tanned Leather

The initial substance is calf leather in the form of pieces of approximately 1 cm, of bulk density 0.2 g/cm$^3$, and having a moisture content of 13%.

The conditions used are identical to those of example 2, with the exception of the substance input flow rate into the extruder, which is 7 kg of dry substance/h, the water feed rate, which is 9.8 l/h, and the temperature profile, which is as follows: conveying at 20° C.-kneading at 40° C.-conveying at 50° C.-kneading at 60° C.-conveying at 70° C. then 80° C.-kneading at 100° C.-conveying.

Following the drying step, a powder of material of bulk density 0.32 g/cm$^3$, substantially greater than that of the initial substance, and a 10% moisture content, is obtained.

The powder is then shaped with conditions in a uniaxial thermopress at 180° C. and 81 MPa for 4 min.

The part obtained has a bulk density of 1.34 g/cm$^3$.

In terms of mechanical performance of this part, the following values are measured, in comparison to those measured for a part obtained with the same protocol from the initial substance, not treated with the method according to the present disclosure: maximum flexural stress of 12.2 instead of 4.2 MPa, bending modulus of 1458 MPa instead of 443 MPa, maximum deformation of 3.4% instead 3%, shock resistance of 2.2 instead of 3. This decrease in the shock resistance clearly indicates that a more brittle and less fibrous material is obtained. Therefore, following the implementation of the method according to the present disclosure, there was indeed a modification of the internal structure of the proteins contained in the initial substance, ensuring superior cohesion of the material.

Figure 1:
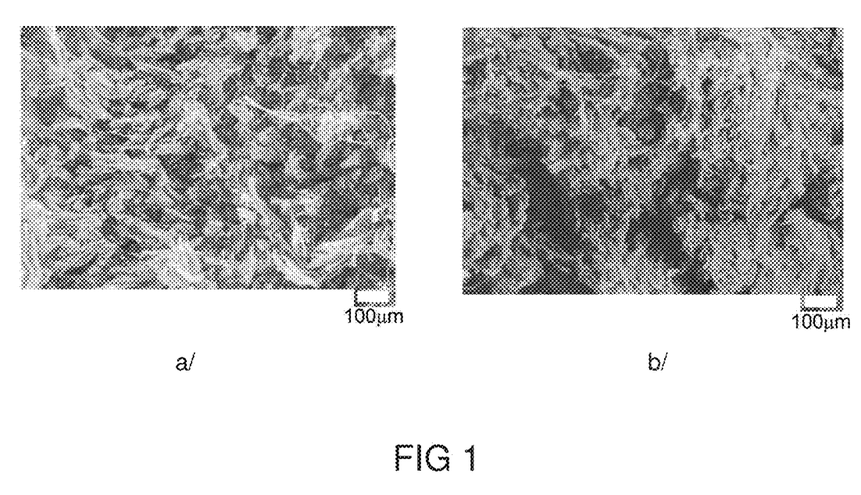
FIG. 1 shows images obtained with a binocular magnifier of the initial substance (in a/) and of the final material obtained by a method according to the present disclosure from this substance (in b/).

FIG. 1 shows images obtained with a Nikon SNZ1500 binocular magnifier of the initial substance (in a/) and of the final material obtained (in b/). It is observed therein that the leather fibers have been transformed and agglomerated during the treatment step of the method according to the present disclosure.

Example 5—Pink-Colored Chromium-Tanned Leather and Use of Sodium Hydroxide

The initial substance is calf leather in the form of pieces of approximately 1 cm, of bulk density 0.2 g/cm$^3$, and having a moisture content of 13%.

The conditions used are identical to those of example 2, with the exception of the substance input flow rate into the extruder, which is 7 kg of dry substance/h, and the feed rate of aqueous solution introduced into the extruder.

In this aqueous solution, the water is supplemented with sodium hydroxide NaOH. Several experiments are carried out, according to the parameters indicated in Table 1 below. The results obtained after the drying step, in terms of bulk density and moisture content of the powder after drying, are also indicated in Table 1.

| Experiment | 1 | 2 | 3 | 4 |
| --- | --- | --- | --- | --- |
| Weight ratio of water to initial substance | 1.4 | 1.4 | 0.9 | 0.5 |
| Weight ratio of NaOH to initial substance | 0.025 | 0.05 | 0.032 | 0.019 |
| NaOH concentration in water (g/l) | 18 | 36 | 36 | 36 |
| Water feed rate (kg/h) | 10.2 | 10.4 | 6.5 | 4 |
| Bulk density of powder obtained (g/cm$^3$) | 0.41 | 0.42 | 0.43 | 0.40 |
| Moisture content of powder obtained (%) | 9 | 10 | 13 | 8 |

For all the experiments, it is observed that the bulk density of the material obtained is substantially greater than that of the initial substance. For all the experiments, it is furthermore greater than that of the powder obtained in example 4 above, without NaOH, from the same leather.

For each experiment, the powder obtained is shaped as described in example 4, but at 170° C. and 81.5 MPa, and the parts formed are tested for the mechanical properties thereof. The results obtained are indicated in Table 2 below.

| Experiment | 1 | 2 | 4 |
| --- | --- | --- | --- |
| Maximum stress (MPa) | 14.5 | 12.0 | 16.9 |
| Bending modulus (MPa) | 1630 | 1460 | 1432 |
| Maximum deformation (%) | 3.2 | 2.1 | 3.4 |

Figure 2:
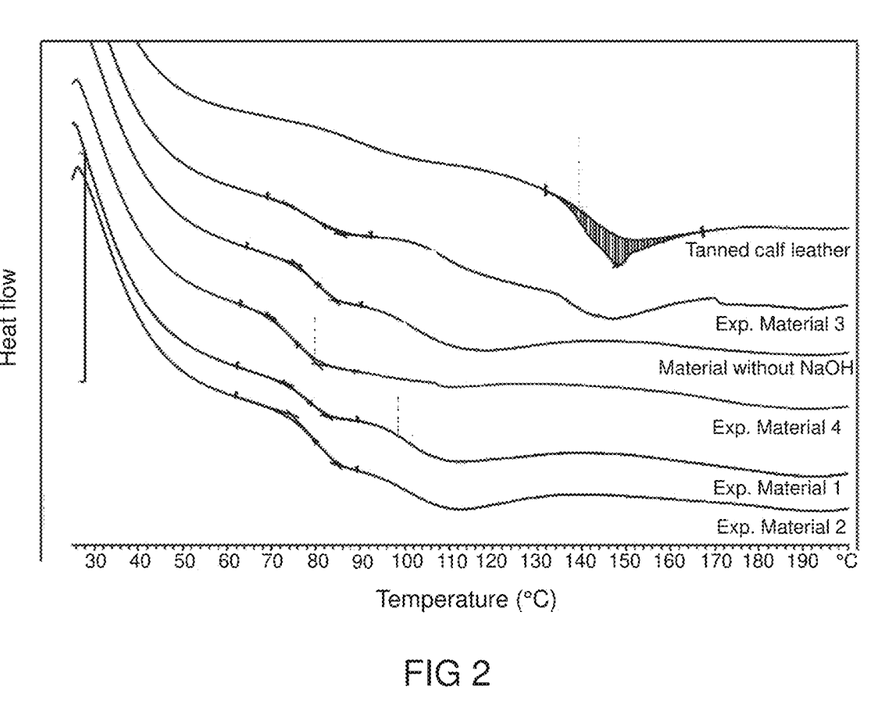
FIG. 2 shows curves obtained by DSC for a chromium-tanned calf leather powder sample, and powders obtained from this material by a method according to the present disclosure, using water alone or water supplemented with different sodium hydroxide concentrations.

Each of the powders of material obtained by the method, as well as the powder obtained in example 4, and the initial leather sample, are analyzed by DSC. The curves obtained are shown in FIG. 2. It is observed that, regardless of the conditions applied, the method of the present disclosure transforms the substance, as demonstrated by the disappearance of the endothermic peak.

Example 6—Chromium-Tanned Leather with Pre-Moistening

The initial substance is chromium-tanned calf leather in the form of pieces of approximately 1 cm, of bulk density 0.2 g/cm$^3$, and having a moisture content of 16%.

This substance is moistened in water in a concrete mixer for 12 h before the extrusion, in a cold chamber at 4° C. in a closed container. The amount of water is chosen to obtain a weight ratio of water to the substance equal to 1.

The conditions used are identical to those of example 2, with the exception of the substance input flow rate into the extruder, which is indicated in Table 3 below, of the fact that no aqueous solution is introduced into the extruder, and of the temperature profile which is as follows: conveying at 20° C. then at 30° C.-kneading at 40° C.-conveying at 40° C. then at 50° C.-kneading at 60° C.-conveying at 60° C. then 70° C.-kneading at 80° C.-conveying.

Two different experiments are carried out, according to the operating conditions indicated in Table 3. The characteristics of the powders obtained after drying are also indicated in this table.

| Experiment | 1 | 2 |
| --- | --- | --- |
| Wet substance flow rate at input (kg/h) | 10 | 12 |
| Dry substance flow rate at input (kg/h) | 5 | 6 |
| Wet substance flow rate at exit (kg/h) | 7.6 | 8.5 |

| Experiment | 1 | 2 |
|---|---|---|
| Moisture content of powder obtained (%) | 12 | 12 |
| Bulk density of powder obtained (g/cm³) | 0.31 | 0.37 |

For each of the experiments carried out, leather granules are obtained for which the DSC analysis confirms the denaturing of the collagen proteins which are contained therein (disappearance of the endothermic peak representative of the denaturing temperature of collagen on the DSC curves).

Example 7—Chromium-Tanned Leather with Pre-Moistening

The initial substance is chromium-tanned calf leather in the form of pieces of approximately 1 cm, of bulk density 0.2 g/cm³, and having a moisture content of 16%.

This substance is moistened in water in a concrete mixer for 12 h before the extrusion, in a cold chamber at 4° C. in a closed container. The amount of water is chosen to obtain a weight ratio of water to the substance equal to 1.

The Clextral BC-45 extruder is used for this experiment, with a rotational speed of the screws of 300 rpm. The screw profile is as follows: conveying at 20° C.-kneading at 30° C.-conveying with mixer at 40° C.-conveying at 80° C.-kneading at 80° C.-conveying at 80° C. then 90° C.-kneading at 90° C.-conveying at 80° C. with filtration-conveying at 80° C. The initial substance is introduced at the start of the first conveying zone, with a flow rate of 2.5 kg of dry substance/h. The extrudate obtained at the extruder exit is dried in a ventilated oven at 40° C. for 24 hours. The specific mass energy to which the material is subjected in the extruder is between 1136 and 1311 Wh/kg. The wet substance flow rate at the exit is 3 kg/h.

A powder of material which has, after drying, a bulk density of 0.35 g/cm³, a moisture content of 11%, and the following grain size distribution is obtained: 0.3% of particles greater than 4 mm in size; 3.3% between 4 and 2 mm in size; 16.1% between 2 and 1.2 mm in size; 18.2% between 1.2 and 0.8 mm in size; 41.3% between 0.8 and 0.25 mm in size; 20.8% less than 0.25 mm in size. The population less than or equal to 800 µm in size, which is predominant in this powder, can be isolated by screening.

Example 8—Chromium-Tanned Leather Blend

The initial substance is a blend of chromium-tanned calf leathers of different colors (red, blue, yellow, orange) in the form of pieces of approximately 1 cm, of bulk density 0.18 g/cm³, and having a moisture content of 13%.

The extruder and the operating parameters are identical to those in example 7, apart from the following differences: the rotational speed of the screws is equal to 200 rpm and the initial substance is introduced at the start of the first conveying zone with a flow rate of 1.5 kg of dry substance/h.

After the drying step, a powder of material having a bulk density of 0.35 g/cm³ and a 12% moisture content is obtained.

The grain size distribution of the grains of powder is as follows: 1.4% greater than 4 mm in size; 5.5% between 2 and 4 mm in size; 14.6% between 1.2 and 2 mm in size; 22.2% between 0.8 and 1.2 mm in size; 34.5% between 0.25 and 0.8 mm in size; 21.8% less than 0.25 mm in size. The population less than or equal to 800 µm in size, which is predominant in this powder, can be isolated by screening.

The proportion of the population less than or equal to 800 µm in size in the powder of material formed according to the present disclosure can be increased by applying, in one or more kneading zones, greater shearing forces on the substance.

Applying the method according to the present disclosure once again to the powder of the material obtained by the method makes it possible advantageously to reduce further the grain size and the properties of this powder.

Example 9—Series of Chromium-Tanned Leathers

Different initial substances are treated successively in the extruder, with a rotational speed of the screws of 250 rpm and a screw/temperature profile which is as follows: conveying at 20° C.-kneading at 30° C.-conveying at 30° C.-mixing at 40° C.-conveying at 60° C.-kneading at 80° C.-conveying at 80° C.-kneading at 90° C.-conveying at 80° C.

The initial substances all consist of pieces of approximately 1 cm in size of chromium-tanned calf leather of different colors, bulk density and moisture content: yellow leather (bulk density 0.17 g/cm³, moisture content 12%, 16.37 kg), then dark blue leather (bulk density 0.17 g/cm³, moisture content 12%, 17.56 kg), then orange leather (bulk density 0.18 g/cm³, moisture content 11%, 14.87 kg), then red leather (bulk density 0.18 g/cm³, moisture content 12%, 20.07 kg).

The solid initial substance input flow rates are, for all the substances, 4.4 kg of dry substance/h. Water is introduced into the extruder at the end of the first conveying zone, just before the first kneading zone, with a flow rate of 3.3 l/h, except for the red leather, for which the water flow rate is 2.8 l/h. The weight ratios of water to initial substance are equal to 0.89 for the yellow, dark blue and orange leathers, and to 0.77 for the red leather.

The extrudates obtained successively at the extruder exit have clearly distinct colors. These extrudates are dried in a ventilated oven at 40° C. for 24 hours.

The characteristics of the powders of material obtained are indicated in Table 4 below.

| Initial substance | Bulk density (g/cm³) | Moisture content (%) |
|---|---|---|
| Yellow | 0.3 | 7 |
| Dark blue | 0.35 | 7 |
| Orange | 0.37 | 7 |
| Red | 0.31 | 7 |

Example 10—Leather Cuttings Tanned with Plant-Based Tanning Agents

The initial substance is a powder of leather cuttings of ovine origin in the form of fibers from 1 to 7 cm in length, of bulk density 0.17 g/cm³ and having a 13% moisture content.

The conditions used are identical to those of example 7, with the exception of the dry substance input flow rate into the extruder, which is 4.35 kg/h, and the water input flow rate into the extruder, which is 2.5 kg/l. The rotational speed of the screws is 200 rpm.

The final drying step is carried out at 50° C. for 24 hours.

A material in dry paste form is obtained which is then ground in a knife mill on a 1 mm screen. The bulk density of the powder obtained after grinding in the knife mill is 0.81 g/cm$^3$.

The grain size distribution is as follows: 0.1% greater than 2 mm in size; 2.8% between 1.2 and 2 mm in size; 32.0% between 0.8 and 1.2 mm in size; 7.0% between 0.25 and 0.8 mm in size; 43.1% between 0.125 and 0.25 mm in size; 15.0% less than 0.125 mm in size.

Example 11—Chromium-Tanned Leather Cuttings

The initial substance is a powder of leather cuttings identical to that of Example 10.

The conditions used are identical to those of example 7, with the exception of the dry substance input flow rate into the extruder, which is 4.2 kg/h, and the water flow rate, which is 3.6 l/h. The rotational speed of the screws is 250 rpm. The extruder is furthermore devoid of a filtration module.

The final drying step is carried out at 50° C. for 24 hours.

A material in the form of a powder having a density of 0.36 is obtained.

The grain size distribution of this powder is as follows: 2.7% greater than 2 mm in size; 29.1% between 1.2 and 2 mm in size; 26.6% between 0.8 and 1.2 mm in size; 3.2% between 0.25 and 0.8 mm in size; 37.8% between 0.125 and 0.25 mm in size; 0.6% less than 0.125 mm in size.

Example 12—Crocodile Leather Cuttings Tanned with Synthetic Agents

The initial substance is a powder of crocodile leather cuttings tanned with synthetic agents, in the particulate form of fibers from 1 to 7 cm in length, of bulk density 0.06 g/cm$^3$.

The conditions used are identical to those of example 11, with the exception of the dry substance input flow rate into the extruder, which is 4.58 kg/h, and the water flow rate, which is 3.3 l/h. The rotational speed of the screws is 200 rpm.

The final drying step is carried out at 50° C. for 24 hours. The material obtained then undergoes a grinding step in a knife mill.

A material in the form of a powder having a density of 0.67 and a 5% moisture content is finally obtained. 41.6% of the grains of this powder have a grain size less than or equal to 0.8 mm.

Example 13—Grey Chromium-Tanned Leather

The initial substance is calf leather in the form of pieces of approximately 1 cm, of bulk density 0.2 g/cm$^3$, and having a moisture content of 13.2%.

The Clextral BC-45 extruder is used for this experiment, with a rotational speed of the screws of 300 rpm. The initial substance is introduced at the start of the first conveying zone, with a flow rate of 5.6 kg of dry substance/h. Water is introduced into the extruder at the end of the first conveying zone, just before the first kneading zone, with a flow rate of 2.32 kg/h. The weight ratio of water to initial substance is equal to 0.6. The temperature profile is as follows: conveying at 20° C., kneading at 30° C., conveying at 30° C., kneading at 40° C., conveying at 60° C., kneading at 80° C., conveying at 90° C., kneading at 90° C. and conveying at 80° C.

The specific mass energy to which the substance is subjected in the extruder is between 1277 and 1345 Wh/kg. The wet substance flow rate at the exit is 6.76 kg/h.

The extrudate obtained at the extruder exit is dried in a ventilated oven at 40° C. for 24 hours.

Following the drying step, a powder of material of bulk density 0.6 g/cm$^3$, substantially greater than that of the initial substance, and a 7.92% moisture content, is obtained.

The grain size distribution of this powder is as follows: 4.2% greater than 2 mm in size; 46.7% between 1 and 2 mm in size; 20.2% between 0.8 and 1 mm in size; 10.8% between 0.5 and 0.8 mm in size; 1.2% between 0.25 and 0.5 mm in size; 15.6% between 0.125 and 0.25 mm in size; 1.4% between 0.032 and 0.125 mm in size.

Example 14—Chromium-Tanned Calf Leather

The initial substance is calf leather in the form of pieces of approximately 1 cm, of bulk density 0.20 g/cm$^3$, having a moisture content of 13.5%.

The Clextral BC-45 extruder is used, with a rotational speed of the screws of 300 rpm. The screw profile is as follows: conveying at 20° C.-kneading (angular shift between lobes 30°) at 30° C.-conveying at 40° C.-kneading (angular shift 90°) at 50° C.-conveying at 90° C.-kneading at 100° C.-conveying at 80° C. The initial substance is introduced at the start of the first conveying zone, with a flow rate of 7 kg of dry substance/h. Water is introduced into the extruder at the end of the first conveying zone, just before the first kneading zone, with a flow rate of 4.2 l/h (weight ratio of water to initial substance equal to 0.6).

The extrudate obtained at the extruder exit is dried in a ventilated oven at 40° C. for 24 hours.

A powder of material of bulk density 0.36 g/cm$^3$, moisture content 8.4%, and having a homogenous grain shape is obtained. 52% of the grains are less than 1 mm in size.

After shaping by uniaxial thermocompression at 150° C. and 80 MPa, as described in Example 2, a part is obtained which, when subjected to a flexural test, has a maximum stress of 18 MPa.

Example 15—Calf Leather Tanned with Plant-Based Tannins

The initial substance is calf leather in the form of pieces of approximately 1 cm, of bulk density 0.21 g/cm$^3$, having a moisture content of 12.2%.

The Clextral BC-45 extruder is used, with a rotational speed of the screws of 300 rpm. The screw profile is as follows: conveying at 20° C.-kneading (angular shift between lobes 30°) at 30° C.-conveying at 40° C.-kneading (angular shift 90°) at 50° C.-conveying at 90° C.-kneading at 100° C.-conveying at 80° C. The initial substance is introduced at the start of the first conveying zone, with a flow rate of 7 kg of dry substance/h. Water is introduced into the extruder at the end of the first conveying zone, just before the first kneading zone, with a flow rate of 4.2 l/h (weight ratio of water to initial substance equal to 0.6).

The extrudate obtained at the extruder exit is dried in a ventilated oven at 40° C. for 24 hours, then milled in a mill.

A powder of material of bulk density 0.7 g/cm$^3$, moisture content 9.1%, and having a homogenous grain shape is obtained. 95% of the grains are less than 1 mm in size.

After shaping by uniaxial thermocompression at 150° C. and 80 MPa, as described in Example 2, a part is obtained which, when subjected to a flexural test, has a maximum stress of 45 MPa.

Example 16—Chromium-Tanned Calf Leather—Water to Substance Ratio=1.6

The initial substance is chromium-tanned calf leather in the form of pieces of approximately 1 cm, of bulk density 0.18 g/cm³, having a moisture content of 12.63%.

The Clextral BC-45 extruder is used, with a rotational speed of the screws of 300 rpm. The screw profile is as follows: conveying at 20° C.-kneading (angular shift between lobes 30°) at 30° C.-conveying at 40° C.-kneading (angular shift 90°) at 50° C.-conveying at 90° C.-kneading at 90° C.-conveying at 80° C. The initial substance is introduced at the start of the first conveying zone, with a flow rate of 7 kg of dry substance/h. Water is introduced into the extruder at the end of the first conveying zone, just before the first kneading zone, with a flow rate of 11.3 l/h (weight ratio of water to initial substance equal to 1.6).

The extrudate obtained at the extruder exit is in the form of a blend of granules with a high moisture content (43%), having a grain size distribution such that: 80.7% of the granules are greater than 2 mm in size and 97.6% of the granules are greater than 1 mm in size.

Comparative Example 1—Extrusion at Ambient Temperature

The initial substance is a blend of chromium-tanned calf leathers of different colors (red, blue, yellow, orange) in the form of pieces of approximately 1 cm, of bulk density 0.18 g/cm³, and having a moisture content of 13%.

The Clextral BC-45 extruder is used, with a rotational speed of the screws of 300 rpm. The temperature in the extruder is set to 25° C. The initial substance is introduced at the start of the first conveying zone, with a flow rate of 5 kg of dry substance/h. Water is introduced into the extruder at the end of the first conveying zone, just before the first kneading zone, with a flow rate of 3 l/h (weight ratio of water to initial substance equal to 0.6).

A powder in the form of small fibers, of cottony appearance, with no shape homogeneity, is obtained, in which the grain size distribution is as follows: 25.2% of particles greater than 2 mm in size, 57.8% of particles greater than 1 mm in size, 42.2% of particles less than 1 mm in size.

The DSC analysis of the powder obtained shows a lack of denaturing of the collagen proteins which are contained therein (no disappearance of the endothermic peak representative of the denaturing temperature of collagen on the DSC curve).

After shaping by uniaxial thermocompression at 150° C. and 80 MPa, as described in Example 2, a part is obtained which, when subjected to a flexural test, has a maximum stress of merely 5 MPa, substantially lower than that obtained for the powders prepared according to the present disclosure.

Comparative Example 2—Extrusion at Maximum Temperature Equal to 50° C.

The initial substance is a blend of chromium-tanned calf leathers of different colors (red, blue, yellow, orange) in the form of pieces of approximately 1 cm, of bulk density 0.18 g/cm³, and having a moisture content of 13%.

The Clextral BC-45 extruder is used, with a rotational speed of the screws of 300 rpm. The screw profile is as follows: conveying at 20° C.-kneading (angular shift between lobes 30°) at 30° C.-conveying at 40° C.-kneading (angular shift 90°) at 45° C.-conveying at 50° C.-kneading at 50° C.-conveying at 50° C. The temperature in the extruder is set to 25° C. The initial substance is introduced at the start of the first conveying zone, with a flow rate of 5 kg of dry substance/h. Water is introduced into the extruder at the end of the first conveying zone, just before the first kneading zone, with a flow rate of 3 l/h (weight ratio of water to initial substance equal to 0.6).

A low-density, cottony powder, with long fibers, of which the shape factor differs substantially from one fiber to another, is obtained at the extruder exit.

In respect of grain size, 18% of the particles are greater than 2 mm in size and 53.4% are less than 1 mm in size. The mechanical properties of this powder are not satisfactory. After drying, the bulk density of this powder is merely 0.23 g/cm³, substantially lower than that of the powders prepared according to the present disclosure.

What is claimed is:

1. A method for preparing a powder of a material of natural origin, comprising a step of treating an initial substance containing at least 70% by weight of leather prepared from non-human animal skin by tanning, in particulate form, in a twin-screw extruder wherein a temperature profile is applied that increases from an initial temperature of between 10° C. and 40° C. in an entry zone of the twin-screw extruder, up to a maximum temperature of between 60° C. and 120° C. in a last kneading zone of the twin-screw extruder, in the presence of water in an amount such that the weight ratio of water to said initial substance is between 0.20 and 6.

2. The method according to claim 1, wherein the step of treating the initial substance is carried out in the presence of water in an amount such that the weight ratio of water relative to the initial substance is greater than or equal to 0.2 and less than 1.6.

3. The method according to claim 1, wherein the step of treating the initial substance is carried out in the presence of water in an amount such that the weight ratio of water relative to the initial substance is between 1.6 and 6.

4. The method according to claim 1, wherein said twin-screw extruder is a co-rotating screw extruder.

5. The method according to claim 1, wherein said initial substance is in particulate form with a grain size between 5 mm and 10 cm.

6. The method according to claim 1, wherein an input flow rate of said initial substance in particulate form into the twin-screw extruder is between 1 and 15 kg/h.

7. The method according to claim 1, wherein said twin-screw extruder includes at least two kneading zones.

8. The method according to claim 7, wherein a rotational speed of the twin-screw extruder screws is between 100 and 400 rpm.

9. The method according to claim 1, wherein said initial substance is placed in the presence of water by introducing an aqueous solution into the twin-screw extruder.

10. The method according to claim 9, wherein the aqueous solution contains an agent for decomplexing chromium-collagen complexes.

11. The method as claimed in claim 9, wherein the aqueous solution is introduced into the twin-screw extruder before a first kneading zone of said twin-screw extruder.

12. The method according to claim 1, comprising a step of drying an extrudate obtained following said treatment step.

13. The method as claimed in claim 1, wherein the step of treating the initial substance is carried out in the presence of water in an amount such that the weight ratio of water relative to the initial substance is equal to 0.25.

14. The method as claimed in claim 1, wherein the step of treating the initial substance is carried out in the presence of water in an amount such that the weight ratio of water relative to the initial substance is equal to 0.6.

15. The method as claimed in claim 1, wherein the initial substance comprises no polymer or polymer precursor substance, and it is not mixed with any polymer or polymer precursor substance during said step of treating in said twin-screw extruder.

16. The method as claimed in claim 1, wherein said twin-screw extruder does not include any die at the exit.

17. A method for preparing a powder of a material of natural origin, comprising a step of treating an initial substance containing at least 70% by weight of leather prepared from non-human animal skin by tanning, in particulate form, in a twin-screw extruder wherein a temperature profile is applied that increases from an initial temperature of between 10° C. and 40° C. in an entry zone of the twin-screw extruder, up to a maximum temperature of between 60° C. and 120° C. in a last kneading zone of the twin-screw extruder, in the presence of water in an amount such that the weight ratio of water to said initial substance is between 0.20 and 6, wherein the step of treating an initial substance is carried out in the presence of water in the amount such that the weight ratio of water relative to the initial substance is comprised between 0.2 and 0.6.

\* \* \* \* \*

UNITED STATES PATENT AND TRADEMARK OFFICE
CERTIFICATE OF CORRECTION

PATENT NO. : 12,351,691 B2  
APPLICATION NO. : 17/759892  
DATED : July 8, 2025  
INVENTOR(S) : Jumeaux et al.

Page 1 of 1

It is certified that error appears in the above-identified patent and that said Letters Patent is hereby corrected as shown below:

On the Title Page

Item (71) Third listed Applicant  
Should read: "INSTITUT NATIONAL DE RECHERCHE POUR L'AGRICULTURE, L'ALIMENTATION ET L'ENVIRONNEMENT"

Signed and Sealed this  
Ninth Day of December, 2025

John A. Squires  
*Director of the United States Patent and Trademark Office*